US009389864B2

(12) United States Patent
Horikawa

(10) Patent No.: US 9,389,864 B2
(45) Date of Patent: *Jul. 12, 2016

(54) DATA PROCESSING DEVICE AND METHOD, AND PROCESSOR UNIT OF SAME

(71) Applicant: NEC CORPORATION, Tokyo (JP)

(72) Inventor: Takashi Horikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/841,918

(22) Filed: Sep. 1, 2015

(65) Prior Publication Data
US 2015/0370565 A1 Dec. 24, 2015

Related U.S. Application Data

(63) Continuation of application No. 13/703,984, filed as application No. PCT/JP2011/002901 on May 25, 2011, now Pat. No. 9,158,542.

(30) Foreign Application Priority Data

Jun. 17, 2010 (JP) ................. 2010-138051

(51) Int. Cl.
*G06F 9/00* (2006.01)
*G06F 9/30* (2006.01)
*G06F 9/52* (2006.01)
(Continued)

(52) U.S. Cl.
CPC .......... *G06F 9/30145* (2013.01); *G06F 9/3004* (2013.01); *G06F 9/30021* (2013.01); *G06F 9/3834* (2013.01); *G06F 9/3851* (2013.01); *G06F 9/526* (2013.01); *G06F 12/126* (2013.01)

(58) Field of Classification Search
CPC .......................... G06F 12/126; G06F 9/30145
See application file for complete search history.

(56) References Cited

U.S. PATENT DOCUMENTS

2006/0080506 A1* 4/2006 Rajamony ........... G06F 12/0813
711/119

FOREIGN PATENT DOCUMENTS

JP 3-237554 A 10/1991
JP 6-266620 A 9/1994
(Continued)

OTHER PUBLICATIONS

Communication dated Apr. 12, 2016 from the Japanese Patent Office in counterpart application No. 2015- 080912.

*Primary Examiner* — Zachary K Huson
(74) *Attorney, Agent, or Firm* — Sughrue Mion, PLLC

(57) ABSTRACT

A processor unit (200) includes: cache memory (210); an instruction execution unit (220); a processing unit (230) that detects fact that a thread enters an exclusive control section which is specified in advance to become a bottleneck; a processing unit (240) that detects a fact that the thread exits the exclusive control section; and an execution flag (250) that indicates whether there is the thread that is executing a process in the exclusive control section based on detection results. The cache memory (210) temporarily stores a priority flag in each cache entry, and the priority flag indicates whether data is to be used during execution in the exclusive control section. When the execution flag (250) is set, the processor unit (200) sets the priority flag that belongs to an access target of cache entries. The processor unit (200) leaves data used in the exclusive control section in the cache memory by determining a replacement target of cache entries using the priority flag when a cache miss occurs.

2 Claims, 8 Drawing Sheets

(51) Int. Cl.
  *G06F 12/12* (2016.01)
  *G06F 9/38* (2006.01)

(56) References Cited

FOREIGN PATENT DOCUMENTS

| JP | 11-259362 A | 9/1999 |
| JP | 2000-305844 A | 11/2000 |
| JP | 2004-145780 A | 5/2004 |
| JP | 2006-276901 A | 10/2006 |
| JP | 2007-272681 A | 10/2007 |
| JP | 2008-257594 A | 10/2008 |
| WO | 2009/122694 A1 | 10/2009 |

\* cited by examiner

DATA PROCESSING DEVICE AND METHOD, AND PROCESSOR UNIT OF SAME

CROSS REFERENCE TO RELATED APPLICATIONS

This application is a Continuation Application of U.S. application Ser. No. 13/703,984, filed Dec. 13, 2012, which is a National Stage of International Application No. PCT/JP2011/002901, filed on May 25, 2011, which claims priority from Japanese Patent Application No. 2010-138051, filed on Jun. 17, 2010, the contents of all of which are incorporated herein by reference in their entirety.

TECHNICAL FIELD

The present invention relates to a data processing device having a multi-processor configuration, and more particularly, to a data processing device and method for performing processes within an exclusive control section, and to a processor unit thereof.

BACKGROUND ART

In a data processing device configured to execute a plurality of threads in parallel, execution of a thread may interrupt at a certain point in time of another thread being executed. Any problems are not caused when the processes executed by these threads do not relate to each other, since the results obtained may not change even if such an interrupt occurs.

However, if a thread being in execution is interrupted by another thread executing another process relating to the process being executed by the interrupted thread, a problem that the obtained results are different from those obtained when the thread is not interrupted may occur. Thus, certain countermeasures need to be taken to that problem.

As an example, a process in which two threads add "1" to the same variable, that is, a process of reading the variable, adding "1" to the variable, and overwriting the variable with the result of the adding may be performed. A problem occurs in a case where a thread process, which has read a variable but has not overwrite the variable with the result of adding 1 yet, is interrupted by another thread process (a process adding 1 to the variable).

If such an interrupt occurs, the process which has been executed first may overwrite the variable with the value obtained by adding "1" to the original value without detecting updating of the variable by an interrupting second process.

When an interrupt of a thread process does not occur, each of two threads performs an operation of adding "1" to a variable, and as a result, the variable is increased by "2". Since each thread performs an operation of adding "1" to the variable, and two threads perform the process, the correct processing results have a value in which "2" is added to the original variable value.

However, if a process progresses in an order such that a thread process interrupts during another thread process as described above, the variable is increased by "1" although two threads have performed the operation of adding "1" to the variable. Thus, correct results are not obtained.

As described above, a processing section (in the above example, a section after reading data and before overwriting processed results) in which a problem occurs if a process interrupts during execution of another process is referred to as an exclusive control section or the like, and in this section, control for preventing the interruption of another thread process is performed explicitly. In this specification, this section will be referred to as an exclusive control section.

If there is just one processor unit that is responsible for executing a program, by inhibiting switching to another process at a point in time when a process enters an exclusive control section and allowing switching to another process at a point in time when the process exits the exclusive control section, it is possible to guarantee that another does not interrupt in that section.

When there is just one processor unit, the reason that execution of a program (thread) interrupts an execution of another program executed as a thread is because an operating system performs switching of threads due to the occurrence of a certain event that triggers switching of threads.

Thus, by instructing the operating system to inhibit switching to another process (thread), even if a certain event that triggers switching of threads occurs in a state where switching of threads is inhibited, it is possible to control so that switching of threads is not performed at that point in time but switching of threads is performed at a point in time when a first program allows switching to another process (thread).

In contrast, in a multi-processor system, it is not possible to guarantee that correct processing results are obtained just by inhibiting switching to another process. This is because inhibiting of switching to another process is effective to a processor unit that is executing the program, but the inhibition does not affect an execution of a program on another processor unit.

As a method of preventing an execution of a program on another processor unit from entering an exclusive control section, a countermeasure to provide a flag (hereinafter referred to as a lock word) that indicates whether there is a thread that is being executed in the exclusive control section is generally adopted.

A thread checks a lock word at a point in time when the thread enters an exclusive control section, and 1) when the lock word is a value indicating a non-use state (hereinafter referred to as "unlocked"), the thread changes the lock word to a value indicating a use state (hereinafter referred to as "locked") and executes processes in the exclusive control section, 2) when the lock word is locked, the thread waits until the lock word becomes unlocked, changes the lock word to "locked," and then executes processes in the exclusive control section.

Moreover, the lock word is re-changed to "unlocked" at a point in time when execution in the exclusive control section ends. By performing the above control, it is possible to eliminate the occurrence of a problem in which a process executed by another processor unit and a process executed by a subject processor unit race with each other in the exclusive control section. The exclusive control section is associated with the correctness of processes performed by a plurality of threads and may become a bottleneck factor that determines the upper limit of the performance of a data processing device.

This is because in a data processing device having a multi-processor configuration, if a certain thread executes processes in an exclusive control section (hereinafter, referred to "uses" in order to treat like other resources), another thread that needs to use the exclusive control section may need to perform an operation of waiting until the thread using the section exits the section.

This means that a wait queue is formed for the exclusive control section similarly to physical resources such as a processor unit or a disk. Thus, when the utilization of the exclusive control section approaches 100% earlier than the other resources with an increase of a load, the exclusive control section becomes a bottleneck that determines the upper-limit of a system performance.

The utilization of the exclusive control section is the product of the number of use times per unit time and one use period. Thus, the above two factors are in an inverse proportional relation in a situation where a throughput performance of the processing of the data processing device is saturated, and the exclusive control section becomes a bottleneck, that is the utilization thereof is 100%.

This is because it is considered that if the exclusive control section becomes a bottleneck, the number of use times per unit time corresponds to a throughput performance of the data processing device. In order to increase the upper limit of the throughput performance of the data processing device in such a situation, it is necessary to shorten one use period of the exclusive control section.

One use period of the exclusive control section is a program execution period from the entering into the exclusive control section to the exiting out of the exclusive control section, and is the product of three factors (1) to (3): (1) the number of instructions executed during that period; (2) the number of clocks per instruction (CPI); and (3) one clock cycle period.

Among these, it is not easy to decrease the two factors (1) and (3), and in many cases, these factors are treated as fixed values. This is because the factor (1) is a factor that is determined by the content of a process that is protected and performed in the exclusive control section, that is an algorithm implemented with a program, and the factor (3) is a factor that is determined by hardware of the data processing device.

On the other hand, the factor (2) is associated with various factors such as an instruction execution architecture of the processor unit or an architecture of a cache memory, and there is a plenty of room for tuning.

A related art concerning implementation of the exclusive control section will be described below. An important thing is that two operations, checking (reading) the value of a lock word when a thread enters an exclusive control section and changing (writing) the lock word to "locked" when the value thereof was "unlocked", are to be treated similarly to the exclusive control section.

Due to this, a processor unit having a multi-processor function is provided with an instruction for performing this operation. For example, the Intel (registered trademark) x86 processor unit is provided with a cmpxchg instruction (see Intel (registered trademark) 64 and IA-32 Architectures Software Developer's Manual Volume 2A: Instruction Set Reference, A-M, http://www.intel.com/Assets/PDF/manual/253666.pdf).

This cmpxchg instruction is an instruction that uses three operands: a register (eax register) reserved by the instruction, a register operand, and a memory operand. This instruction atomically performs a series of operations: (1) an operation of reading the value of a memory operand into a processor unit; (2-1) an operation of writing the value of the register operand to external memory when the read value equals to the value of the eax register; and (2-2) an operation of writing the read value to the eax register when the read value does not equal to the value of the eax register.

Atomic as used herein means that a hardware operation guarantees that another processor unit does not access external memory during the memory read operation of (1) and the memory write operation of (2-1). An operation that the cmpxchg instruction performs is often called "Compare And Swap (CAS instruction)."

When a lock operation is performed using the CAS instruction, the CAS instruction is executed using the memory operand as a lock word, filling "unlocked" into the eax register, and filling "locked" into the register operand.

Since the operation (2-1) is executed when the lock word is "unlocked," the lock word is updated to "locked," and the value of the eax register is not changed. On the other hand, since the operation (2-2) is executed when the lock word is "locked," writing to the lock word is not performed, and "locked" is set to the eax register.

A thread that has executed a CAS instruction may check whether the lock operation has succeeded or failed by checking the value of the eax register after executing the CAS instruction. That is, the thread may determine whether it will execute the exclusive control section or will enter a state of waiting until "unlocked" is set to the lock word.

Presently, various examples of the data processing device described above have been proposed (see Patent Documents 1 to 4).

RELATED DOCUMENT

Patent Document

Patent Document 1: Japanese patent application publication NO. 2000-305844
Patent Document 2: Japanese patent application publication NO. 2006-276901
Patent Document 3: Japanese patent application publication NO. 2007-272681
Patent Document 4: Japanese patent application publication NO. H11-259362

SUMMARY OF THE INVENTION

Here, in a data processing device having a multi-processor configuration, when an exclusive control section becomes a performance bottleneck, it is necessary to shorten the period from the entering into the exclusive control section to the exiting out of the exclusive control section in order to improve the performance. However, since it is difficult to implement a method of decreasing the amount of processes performed within the exclusive control section, it is difficult to improve the performance of the data processing device being in such an operation state.

In a data processing device having a multi-processor configuration, when the exclusive control section becomes a performance bottleneck, the upper limit of the throughput performance of the data processing device is determined by the period from the entering into the exclusive control section to the exiting out of the exclusive control section.

However, since the process performed within the exclusive control section is determined by an algorithm that is implemented with a program, it is necessary to change the entire algorithm in order to change the process. Due to such a reason, as described above, it is difficult to decrease the amount of processes performed within the exclusive control section.

The present invention has been made in view of the problems described above, and an object of the present invention is to provide a data processing device, a method, and a processor unit thereof that can shorten the period from the entering into the exclusive control section to the exiting out of the exclusive control section.

According to a first aspect of the present invention, there is provided a data processing device including an external memory that stores an instruction and data necessary for execution of the instruction and a plurality of processor units, each of the plurality of processor units including: a cache memory that temporarily stores the instruction and the data; an instruction execution unit that reads the instruction and the data from the external memory through the cache memory and executes the instruction; an initiation detecting unit that detects an entering of a thread implemented by processing of the instruction execution unit into an exclusive control section which is determined in advance to become a bottleneck; a termination detecting unit that detects an exiting of the thread out of the exclusive control section which is determined in advance to become the bottleneck; and an execution flag that stores a two-valued flag that indicates whether there is the thread that is executing a process in the exclusive control section which becomes the bottleneck based on detection results of the initiation detecting unit and the termination detecting unit, wherein the cache memory temporarily stores a priority flag in eviction candidate determination information for determining eviction candidates that are included in each cache entry, the priority flag indicating whether data is to be used during execution in the exclusive control section, and in a case where the execution flag is set when the instruction execution unit accesses the external memory, each of the plurality of processor units sets the priority flag that belongs to an access target of cache entries, and leaves data used in the exclusive control section in the cache memory by using the priority flag when determining a replacement target of cache entries due to a fact that the memory access of the instruction execution unit results in a cache miss.

According to a second aspect of the present invention, there is provided a data processing method in a plurality of processor units, each including a cache memory that temporarily stores an instruction and data and an instruction execution unit that reads the instruction and the data from an external memory through the cache memory and executes the instruction, the method allowing each processor unit to perform: detecting an entering of a thread implemented by processing of the instruction execution unit into an exclusive control section which is determined in advance to become a bottleneck; detecting an exiting of the thread out of the exclusive control section; reflecting, in an execution flag, whether there is the thread that is executing a process in the exclusive control section from the detection results; in a case where the execution flag is set when the instruction execution unit accesses the external memory, setting a priority flag that belongs to an access target of cache entries among cache entries that are stored in the cache memory, the access target cache entry including eviction candidate determination information for determining eviction candidates in which the priority flag that indicates whether data is to be used during execution in the exclusive control section is temporarily stored; and leaving data used in the exclusive control section in the cache memory by using the priority flag when determining a replacement target of cache entries due to a fact that the memory access of the instruction execution unit results in a cache miss.

According to a third aspect of the present invention, there is provided a processor unit which is mounted in a plural number in a data processing device that includes an external memory that stores an instruction and data necessary for execution of the instruction, the processor unit including: a cache memory that temporarily stores the instruction and the data; an instruction execution unit that reads the instruction and the data from the external memory through the cache memory and executes the instruction; an initiation detecting unit that detects an entering of a thread implemented by processing of the instruction execution unit into an exclusive control section which is determined in advance to become a bottleneck; a termination detecting unit that detects an exiting of the thread out of the exclusive control section; and an execution flag that stores a two-valued flag that indicates whether there is the thread that is executing a process in the exclusive control section from detection results of the initiation detecting unit and the termination detecting unit, wherein the cache memory temporarily stores a priority flag in eviction candidate determination information for determining eviction candidates that are included in each cache entry, the priority flag indicating whether data is to be used during execution in the exclusive control section, and in a case where the execution flag is set when the instruction execution unit accesses the external memory, the processor unit sets the priority flag that belongs to an access target of cache entries, and the processor unit leaves data used in the exclusive control section in the cache memory by using the priority flag when determining a replacement target of cache entries due to a fact that the memory access of the instruction execution unit results in a cache miss.

Each of components of the present invention may be formed so as to realize the functions. For example, the components can be realized as dedicated hardware that performs a predetermined function, a data processing device in which a predetermined function is provided with a computer program, a predetermined function that is realized in a data processing device with a computer program, and any combination of these functions.

Moreover, each of components of the present invention may not be individual entities. A plurality of components may be formed as one member, one component may be formed as a plurality of members, a certain component may be a part of another component, and a part of a certain component may be the same as a part of another component.

Moreover, the data processing method of the present invention describes a plurality of processes and operations in order. However, the order of executing the plurality of processes and the plurality of operations is not limited to the described order. Thus, when the data processing method of the present invention is implemented, the order of the plurality of processes and the plurality of operations can be changed unless it causes a problem in terms of content.

Further, in the data processing method of the present invention, the plurality of processes and the plurality of operations are not limited to being executed individually in different points in time. Thus, another process or operation may occur during execution of a certain process or operation, and the timing of the execution of another process or operation may partially or wholly overlap with the timing of the execution of a certain process or operation.

Moreover, the data processing device of the present invention can be implemented as hardware constructed with general-purpose devices such as a central processing unit (CPU), read only memory (ROM), random access memory (RAM), and an interface (I/F) unit so as to read a computer program to execute the corresponding processing operation, a dedicated logical circuit constructed to execute a predetermined processing operation, and combinations thereof.

According to either of aspects described above, it is possible to leave data in the cache memory, which data is highly likely to be used in the exclusive control section in the future, and thereby to increase a cash hit ratio during the subsequent execution in the exclusive control section. As a result, it is possible to shorten the execution time in the exclusive control section. Due to this, it is possible to improve the performance of the data processing device having a multi-processor configuration in which the exclusive control section becomes a performance bottleneck without changing processes executed in the exclusive control section.

DESCRIPTION OF EMBODIMENTS

Figure 1:
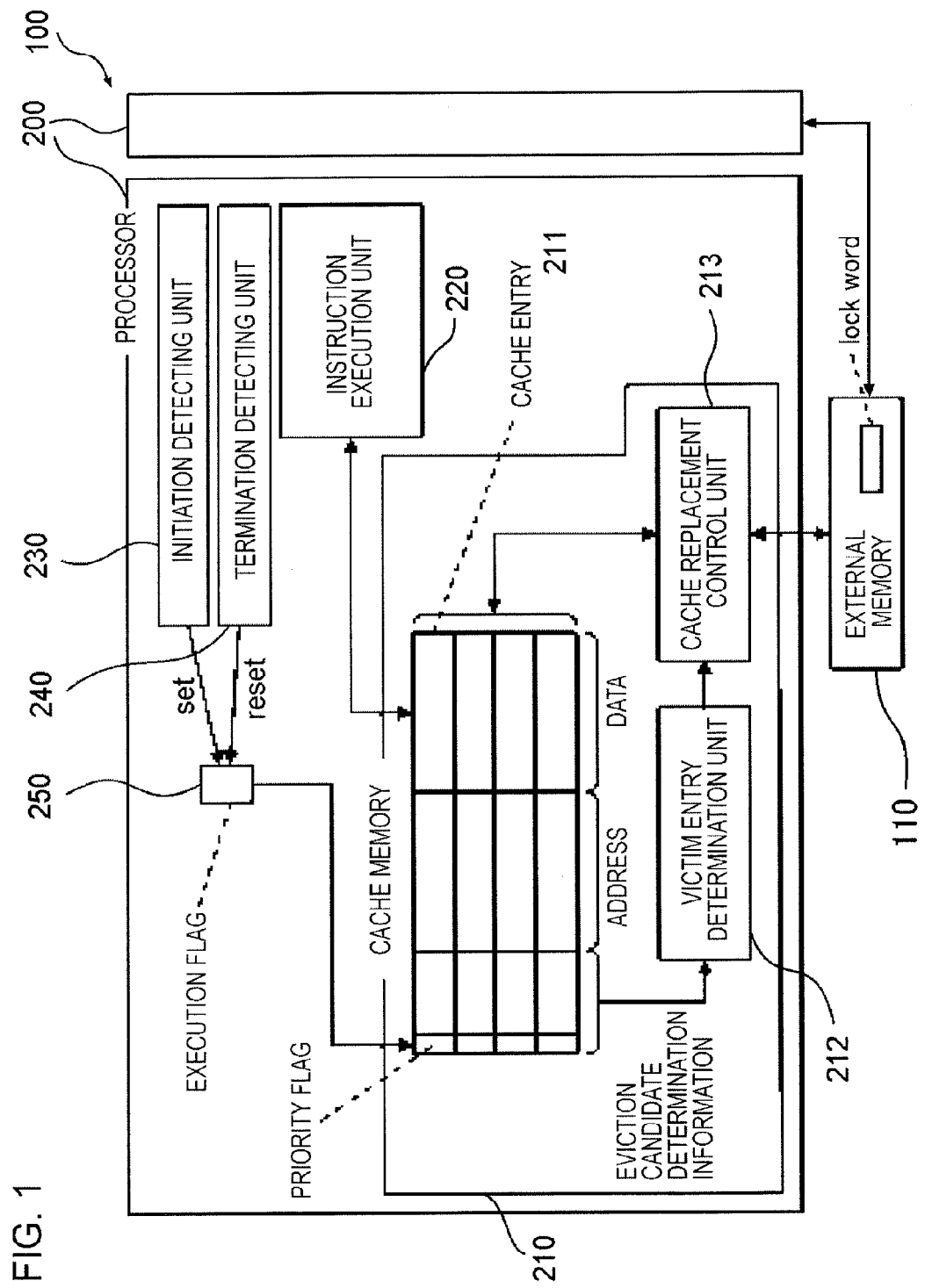
FIG. 1 is a schematic block diagram illustrating a configuration of a data processing device according to a first embodiment of the present invention.

A first embodiment of the present invention will be described with reference to FIG. 1. As illustrated in the figure, a data processing device 100 according to the present embodiment includes external memory 110 that stores instructions and data necessary for execution of instructions, and a plurality of processor units 200.

In the data processing device 100 of the present embodiment, each of the plurality of processor units 200 includes cache memory 210 that temporarily stores instructions and data, an instruction execution unit 220 that reads instructions and data from the external memory 110 via the cache memory 210 and executes instructions, an initiation detecting unit 230 that detects the entering of a thread into an exclusive control section which is predetermined to become a bottleneck, a termination detecting unit 240 that detects the exiting of the thread out of the exclusive control section, and an execution flag 250 that stores a two-valued flag that indicates whether there is a thread that is executing a process in the exclusive control section based on the detection results of the initiation detecting unit 230 and the termination detecting unit 240.

Here, the thread means any unit of processing which is realized when the instruction execution unit 220 executes a program (the instruction), and has the same meaning as a process, a task, or the like. The present embodiment does not restrict this unit of processing.

The cache memory 210 temporarily stores a priority flag, which indicates whether data is to be used during an execution in the exclusive control section, in eviction candidate determination information that is used in order to determine eviction candidates and is included in each cache entry. When the execution flag 250 is set when the instruction execution unit 220 accesses the external memory 110, a priority flag that belongs to a cache entry being accessed is set.

The data processing device 100 according to the present embodiment leaves data used in the exclusive control section in the cache memory 210, using the priority flag when determining a replacement target of cache entries when the access of the instruction execution unit 220 to the external memory 110 results in a cache miss.

More specifically, the cache memory 210 includes a plurality of cache entries 211 which includes data, an address, and the eviction candidate determination information, a victim entry determination unit 212 that determines a cache entry to be replaced, and a cache replacement control unit 213.

The instruction execution unit 220 reads an instruction to be executed and data necessary for executing the instruction from the external memory 110 via the cache memory 210 and executes the read instruction similarly to the processes of a general processor. When an operation of writing data to the external memory 110 is required due to an execution of the instruction, the data is written via the cache memory 210.

Further, the processor unit 200 is provided with a CAS instruction for implementing the exclusive control, and performs an atomic access to a lock word that exits in the external memory 110.

Each of these operates schematically in the following manner. First, the instruction execution unit 220 reads an instruction to be executed and data necessary for executing the instruction from the external memory 110 via the cache memory 210 and executes the read instruction similarly to the processes of a general processor.

When an operation of writing data to the external memory 110 is required due to an execution of the instruction, the data is written via the cache memory 210. Further, the processor unit 200 is provided with a CAS instruction for implementing the exclusive control, and performs an atomic access to a lock word that exits in the external memory 110.

The initiation detecting unit 230 detects an event that a program being executed by the instruction execution unit 220 has initiated execution in a predetermined exclusive control section, and then sets the execution flag 250. That is, the initiation detecting unit 230 may be expressed as an exclusive control section execution initiation detecting unit.

Similarly, the termination detecting unit 240 detects an event that a program being executed by the instruction execution unit 220 has terminated execution in the predetermined exclusive control section, and then resets the execution flag 250. That is, the termination detecting unit 240 may be expressed as an exclusive control section execution termination detecting unit.

The execution flag 250 is referenced when an access to the external memory 110 via the cache memory 210 is performed during an execution of a program by the instruction execution unit 220, and when this flag is set, a priority flag within cache entry 211 being accessed is set. That is, the execution flag 250 may be expressed as an exclusive control section execution flag. Moreover, the priority flag may be expressed as an exclusive control section priority flag.

When the access of the instruction execution unit 220 to the external memory 110 results in a cache miss, that is, when the access target of data is not present in the cache memory 210, the cache memory 210 determines a replacement target of cache entry from the plurality of cache entries 211 in which the data can be placed, disposes the access target of data in the entry, and supplies the data to the instruction execution unit 220.

An operation of determining the replacement target entry is performed by the victim entry determination unit 212 in the following manner with eviction candidate determination information (including the information about a priority flag), corresponding to a plurality of cache entry 211 in which data required by instruction execution unit 220 can be placed, as its input.

First, when either of a cache entry in which a priority flag is set and a cache entry in which a priority flag is not set (in a reset state) are present, the victim entry determination unit 212 selects a replacement target cache entry based on the eviction candidate determination information other than the priority flag, included in a cache entry in which the priority flag is not set.

Moreover, when all priority flags of the plurality of cache entries 211 in which the data requested by the instruction execution unit 220 can be placed have the same value (in a set or reset state), the victim entry determination unit 212 selects a replacement target cache entry from the eviction candidate determination information other than the priority flags included in these entries.

Here, an operation of selecting the replacement target cache entry from the eviction candidate determination information other than the priority flag is the same as a general method of determining a replacement target cache entry. Moreover, since the eviction candidate determination information other than the priority flag are well known, description thereof will not be provided here.

When a replacement target cache entry is selected in the above-described manner, the cache replacement control unit 213 performs a cache entry replacement operation as below. In an operation of replacing the cache entry 211, (1) a data block in which the data requested by the instruction execution unit 220 is present is read from the external memory 110, and the read data block is set to a data portion; (2) the address of the access target address is set to an address portion; (3) a piece of information used to determine a replacement candidate is set to a part of the eviction candidate determination information other than the priority flag similarly to a general cache memory; and (4) the value of the execution flag 250 is set to the priority flag.

The present embodiment has the following features. (1) The execution flag 250 reflects whether a program being executed by the instruction execution unit 220 is executed in the predetermined exclusive control section. (2-a) When the access of the instruction execution unit 220 to the external memory 110 via the cache memory 210 results in a cash hit, the value of the execution flag 250 is set to the cache entry 211 in which the access target data is present. (2-b) When the access results in a cache miss, the replacement target cache entry is determined using the priority flag information.

As described above, the data processing device 100 according to the present embodiment leaves data that is highly likely to be used in the exclusive control section in the future in the cache memory 210, thereby increasing a cash hit ratio during the subsequent execution in the exclusive control section. As a result, it is possible to shorten the execution time in the exclusive control section.

Due to this, it is possible to improve the performance of the data processing device 100 having a multi-processor configuration in which the exclusive control section is a performance bottleneck without changing processes executed in the exclusive control section.

First Example

Figure 2:
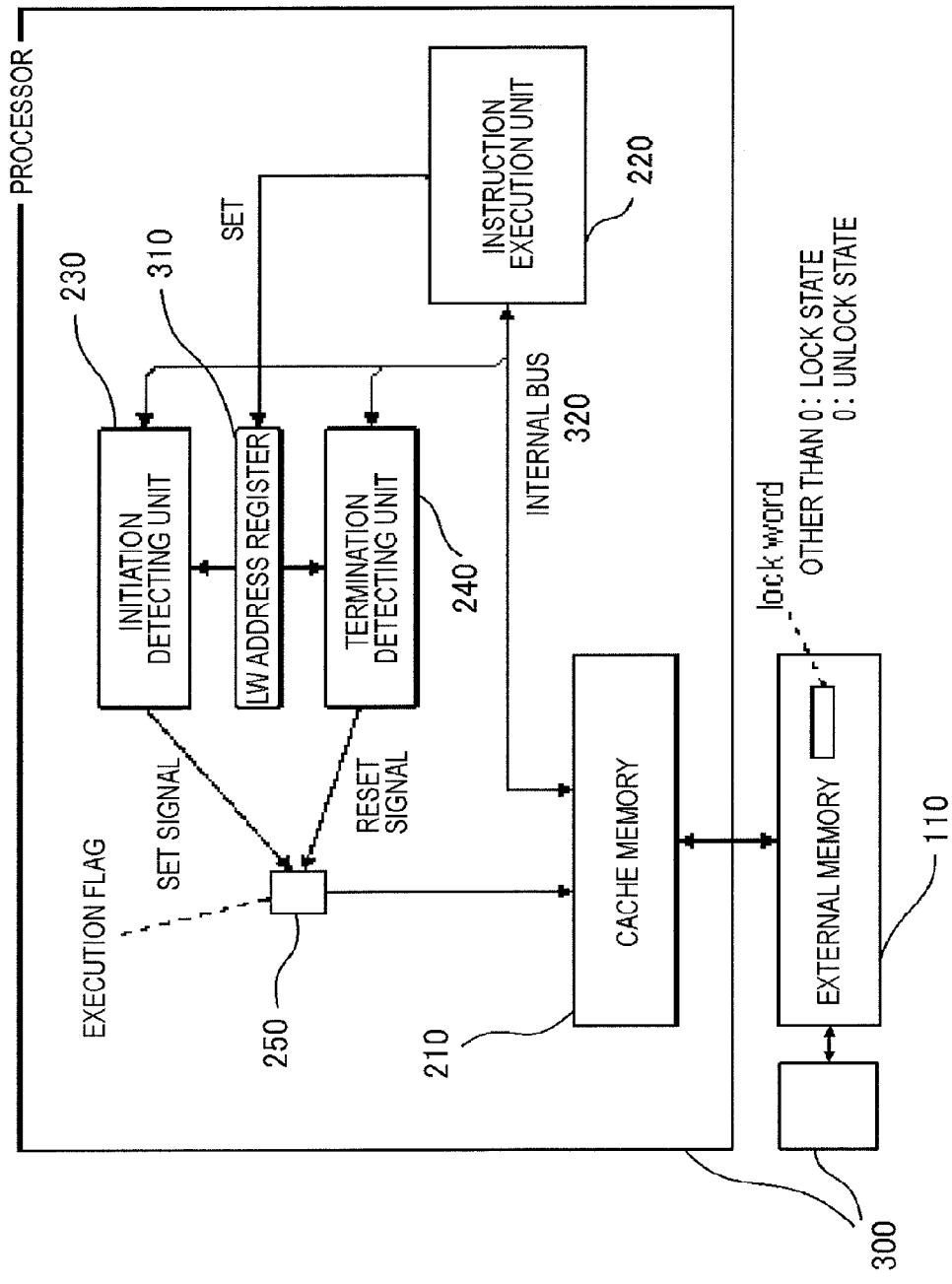
FIG. 2 is a schematic block diagram illustrating a configuration of a data processing device according to an implementation example of the present invention.

Next, an operation of a mode for carrying out the present invention will be described with reference to a specific implementation example. As illustrated in FIG. 2, a processor unit 300 according to the present implementation example includes an LW address register 310.

Moreover, the initiation detecting unit 230 and the termination detecting unit 240 are connected to the LW address register 310 and an internal bus 320 for transferring addresses or data of the external memory 110 to be accessed between the instruction execution unit 220 and the cache memory 210.

The value stored in the LW address register 310 is configured to be set from the instruction execution unit 220, and the LW address register 310 stores the address of a lock word corresponding to an exclusive control section which is a bottleneck.

It is assumed that the address of a lock word corresponding to an exclusive control section, which is a bottleneck, of a program that operates on the processor unit 300 is known in advance by pre-profiling by the developer of a program executed on the processor unit 300 or a system manager. It is also assumed that the address of the lock word is set to the LW address register 310 during initialization operation immediately before execution of the program or immediately after running of the program.

Moreover, in the processor unit 300 of the present implementation example, it is assumed that when the lock word has a value of 0, the lock word indicates an unlock state (a state where a thread that performs execution in the corresponding exclusive control section is not present), and that when the lock word has a value other than 0, the lock word indicates a lock state (a state where a thread that performs execution in the corresponding exclusive control section is present).

Figure 3:
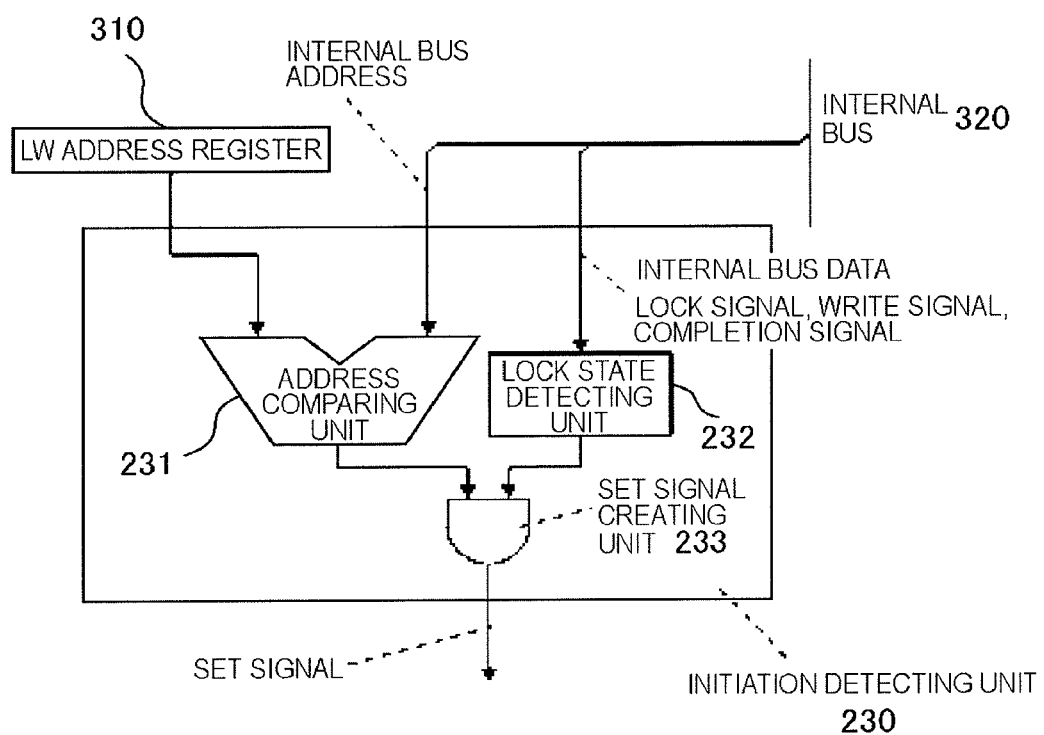
FIG. 3 is a schematic block diagram illustrating a configuration of main parts of a processor unit.

As illustrated in FIG. 3, the initiation detecting unit 230 includes an address comparing unit 231 that receives the addresses of the LW address register 310 and the internal bus 320 as its input, a lock state detecting unit 232 that receives the data portion of the internal bus 320, a Lock signal, a write signal, and a completion signal as its input, and a set signal creating unit 233 that receives the outputs of the address comparing unit 231 and the lock state detecting unit 232 as its input.

Figure 4:
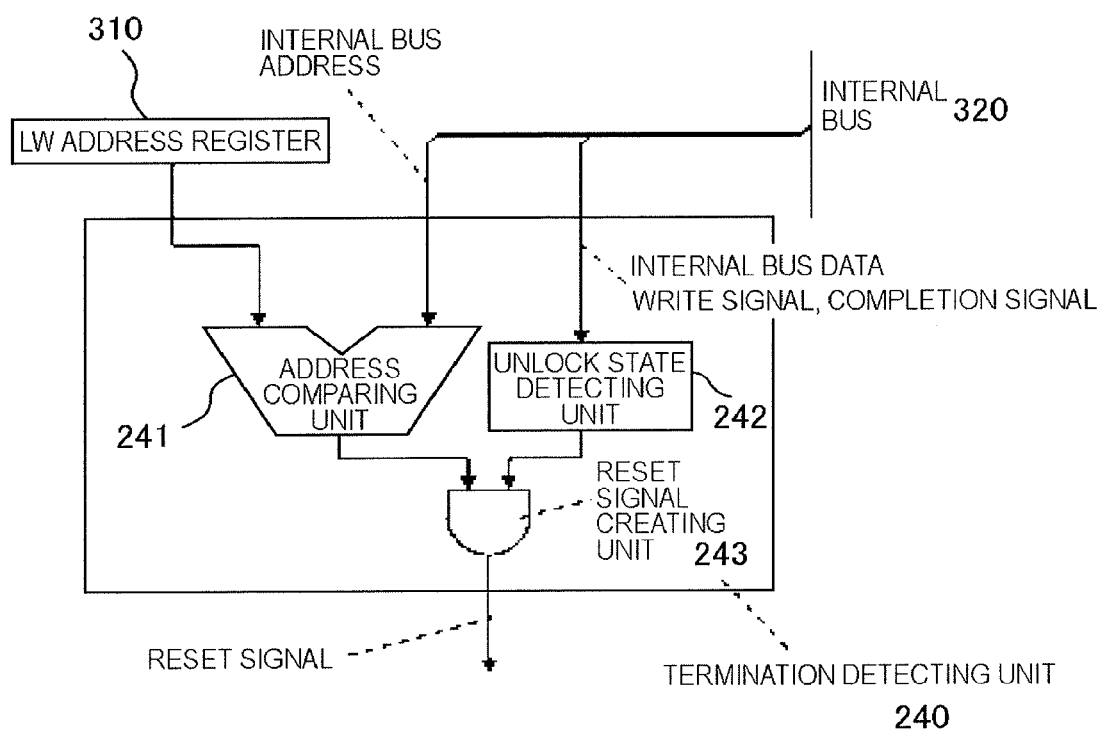
FIG. 4 is a schematic block diagram illustrating a configuration of main parts of the processor unit.

As illustrated in FIG. 4, the termination detecting unit 240 includes an address comparing unit 241 that receives the addresses of the LW address register 310 and the internal bus 320 as its input, an unlock state detecting unit 242 that receives the data portion of the internal bus 320, a Lock signal, a write signal, and a completion signal as its input, and a reset signal creating unit 243 that receives the outputs of the address comparing unit 241 and the unlock state detecting unit 242 as its input.

The set signal of the initiation detecting unit 230 and the reset signal of the termination detecting unit 240 are sent to the execution flag 250 as illustrated in FIG. 2.

Figure 5:
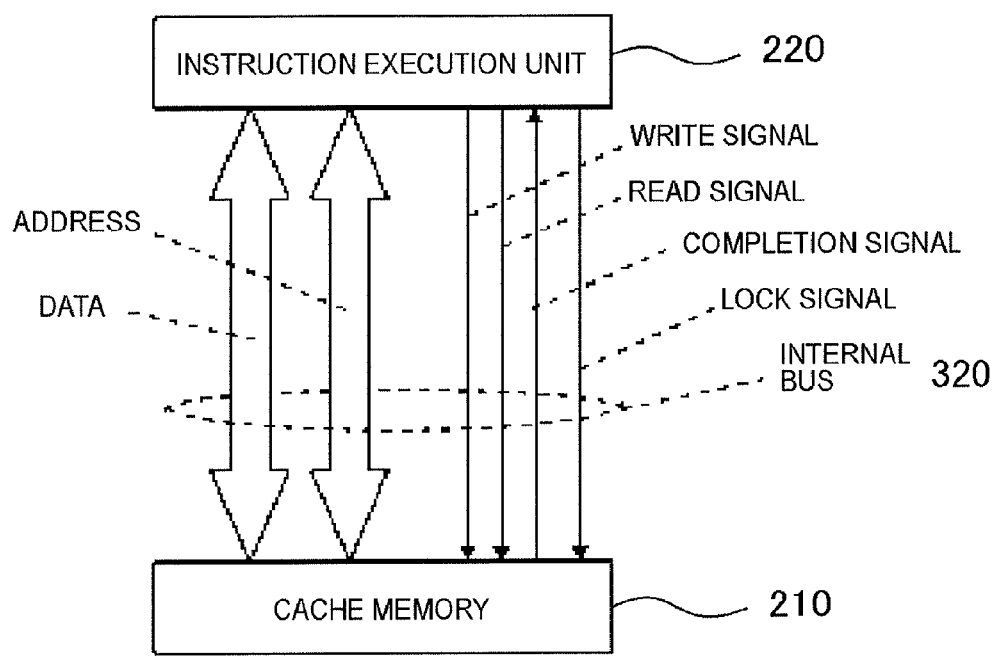
FIG. 5 is a schematic block diagram illustrating a relation between an instruction execution unit and a cache memory of the processor unit.

Moreover, as illustrated in FIG. 5, addresses, data, a write signal, a read signal, a completion signal, and a Lock signal are present in the internal bus 320 that transfers data. These signals operate similarly to a bus according to the related art.

When execution is initiated in the exclusive control section of the present implementation example, the processor unit 300 operates in the following manner. A process can enter the exclusive control section when an operation of rewriting a lock word from 0 to a value other than 0 has succeeded by an atomic access of the processor unit 300.

This atomic access is performed according to an access from the instruction execution unit 220 to the external memory 110 via the cache memory 210. In that case, an operation of sending the address of the lock word from the instruction execution unit 220 to the cache memory 210 is performed in the address portion of the internal bus 320. An operation of sending the value of the external memory 110 to the instruction execution unit 220 and an operation of sending a value that the instruction execution unit 220 writes into the external memory 110 to the cache memory 210 are performed in the data portion.

Figure 6:
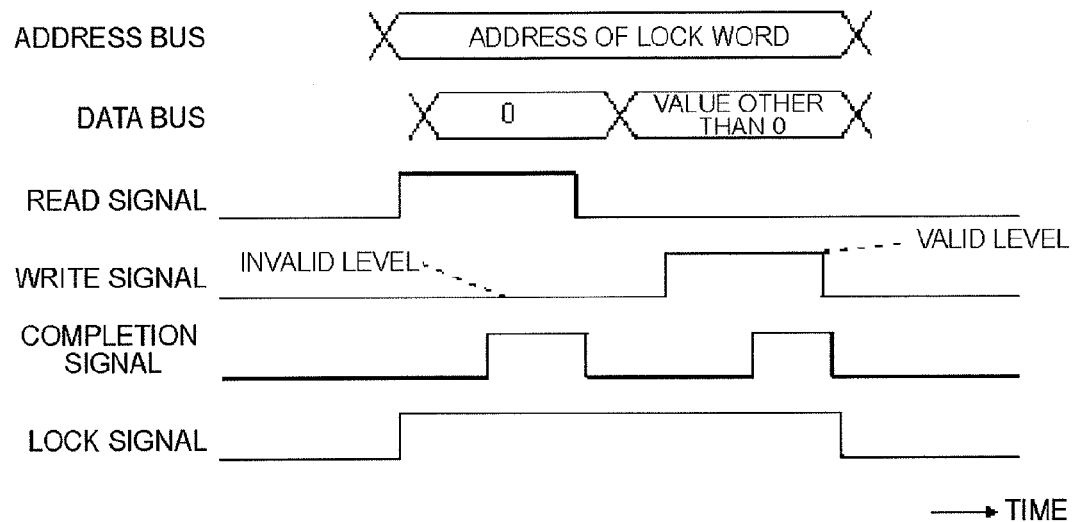
FIG. 6 is a timing chart illustrating a case in which an atomic access of the processor unit has succeeded.

FIG. 6 illustrates a timing chart when the atomic access has succeeded. In this atomic access, when a read operation is initiated, the instruction execution unit 220 sets a Lock signal and a read signal to be valid and sends the address of the lock word which is an access target through an address bus.

The cache memory 210 having received these signals accesses the external memory 110 as necessary, and acquires the value (in this case "0") of the lock word. Then, the cache memory 210 sends the value to the instruction execution unit 220 through a data bus and sets the completion signal to be valid.

The completion signal is reset to be invalid when the cache memory 210 detects that the instruction execution unit 220 has received the value "0" and has set the read signal to be invalid. Subsequently, the instruction execution unit 220 compares the read data with the value of a register that is defined by an instruction being executed.

When both values are not identical, the instruction execution unit 220 resets the Lock signal to be invalid, terminates execution of the instruction, and sets the execution result of the instruction to failure. In contrast, when both values are equivalent, the instruction execution unit 220 sends the value other than 0 that is defined by an instruction being executed to the cache memory 210 through a data bus and sets the write signal to a valid level.

By this operation, the cache memory 210 writes the sent value other than 0 to the lock word. When this writing is completed, the cache memory 210 sets the completion signal to be valid.

Upon detecting that the completion signal is set to be valid, the instruction execution unit 220 sets the write signal and the Lock signal to an invalid level, and completes sending of the address of the lock word to the address bus and sending of the value other than 0 to the data bus. The cache memory 210 having detected the above sets the completion signal to be invalid.

When the above operation is completed, the instruction execution unit 220 terminates execution of an instruction and sets the execution result of the instruction to success. Further, the Lock signal is set to the valid level only when the atomic access is executed, and the Lock signal remains in the invalid level when a general read operation or a general write operation, either of which are not the atomic access, is performed to the external memory 110.

In the above operation, the lock state detecting unit 232 of the initiation detecting unit 230 sets the output of the lock state detecting unit 232 to be valid when all of the write signal, the completion signal, and the Lock signal are valid, a state where the value other than 0 is sent through the data of the internal bus 320 is detected, and all conditions are satisfied.

Moreover, the address comparing unit 231 compares the address of the external memory 110 sent through the address of the internal bus 320 with the value that is set in advance in the LW address register 310, and sets the output of the address comparing unit 231 to be valid when the values are equivalent.

When both of the outputs of the lock signal detecting unit and the address comparing unit 231 are valid, the set signal which is the output of the initiation detecting unit 230 is set to be valid. That is, the set signal is valid when all of the write signal, the completion signal, and the Lock signal are valid, the value other than 0 is sent through the data of the internal bus 320, and the address of the external memory 110 sent through the address of the internal bus 320 equals to the value that is set in advance in the LW address register 310, that is, when an operation of accessing the lock word corresponding to the exclusive control section which is a bottleneck and acquiring a lock has succeeded. Therefore, the execution flag 250 that receives the set signal as its input is set to be valid when a certain thread enters the exclusive control section which is a bottleneck.

Moreover, when termination of the exclusive control section in the present implementation example is initiated, the following operation is performed. Since the number of threads that can simultaneously enter the corresponding exclusive control section is 1 due to the exclusive control using the lock word, only a thread that has entered the exclusive control section is allowed to perform an operation of rewriting the lock word to 0 from the value other than 0 as long as a program is correctly created.

Thus, the access to the external memory 110 for this rewriting can be performed by a general write operation other than the atomic access, that is, a write operation from the instruction execution unit 220 to the external memory 110 via the cache memory 210.

In that case, an operation of sending the address of the lock word from the instruction execution unit 220 to the cache memory 210 is performed in the address portion of the internal bus 320. An operation of sending the value of the external memory 110 to the instruction execution unit 220 and an operation of sending the value that the instruction execution unit 220 writes into the external memory 110 to the cache memory 210 are performed in the data portion of the internal bus 320.

Figure 7:
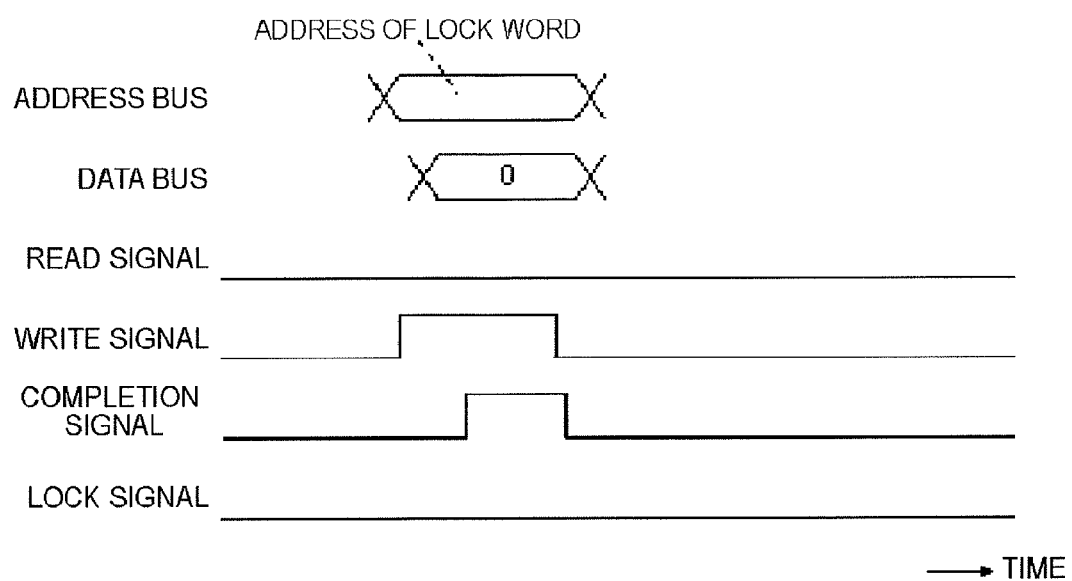
FIG. 7 is a timing chart illustrating a write access of the processor unit.

FIG. 7 illustrates a timing chart of the write access. When the write operation is initiated, the instruction execution unit 220 sends the address of a lock word that the instruction execution unit 220 is to access through the address of the internal bus 320 and the value 0 to the cache memory 210 through the data bus, and sets the write signal to a valid level.

By this operation, the cache memory 210 writes the sent value 0 to the lock word. When this writing is completed, the cache memory 210 sets the completion signal to be valid. Upon detecting that the completion signal is set to be valid, the instruction execution unit 220 sets the write signal and the Lock signal to an invalid level, and completes sending of the address of the lock word to the address bus and sending of the value other than 0 to the data bus. The cache memory 210 having detected the above sets the completion signal to be invalid. When the above operation is completed, the instruction execution unit 220 terminates execution of the instructions.

In the above operation, the unlock state detecting unit 242 of the termination detecting unit 240 sets the output of the unlock state detecting unit 242 to be valid when the write signal and the completion signal are valid, a state where the value 0 is sent through the data of the internal bus 320 is detected, and all conditions are satisfied.

Moreover, the address comparing unit 241 compares the address of the external memory 110 sent through the address of the internal bus 320 with the value that is set in advance in the LW address register 310, and sets the output of the address comparing unit 241 to be valid when the values are equivalent.

When both of the outputs of the unlock state detecting unit 242 and the address comparing unit 241 are valid, the reset signal which is the output of the termination detecting unit 240 is set to be valid. That is, the reset signal is valid when the write signal and the completion signal are valid, the value 0 is sent through the data of the internal bus 320, and the address of the external memory 110 sent through the address of the internal bus 320 is equivalent to the value that is set in advance in the LW address register 310, that is, when an operation of writing the value 0 to the lock word corresponding to the exclusive control section which is a bottleneck and releasing a lock has been performed.

Therefore, the execution flag 250 that receives the reset signal as its input is set to be invalid when certain thread exits from the exclusive control section which is a bottleneck. The operation of the cache memory 210 inputting the value of the execution flag 250 is the same as that described in the description of embodiments.

Second Implementation Example

Next, a second implementation example of the present invention will be described. The feature of this implementation example is that a set instruction of the execution flag 250 and a reset instruction of the execution flag 250 are added to the instructions executed by the instruction execution unit 220 in FIG. 1.

Moreover, the initiation detecting unit 230 of this implementation example sets the set signal to be valid when the instruction execution unit 220 executes the set instruction of the execution flag 250. The termination detecting unit 240 sets the reset signal to be valid when the instruction execution unit 220 executes the reset instruction of the execution flag 250.

The set instruction of the execution flag 250 and the reset instruction of the execution flag 250 are embedded in an execution program at the time of coding, compiling, or linking the execution program.

Specifically, this embedding of the instructions involves embedding the set instruction of the execution flag 250 to a process that is executed when starting the exclusive control section, which is a bottleneck, and embedding the reset instruction of the execution flag 250 to a process that is executed when terminating the exclusive control section.

Figure 8:
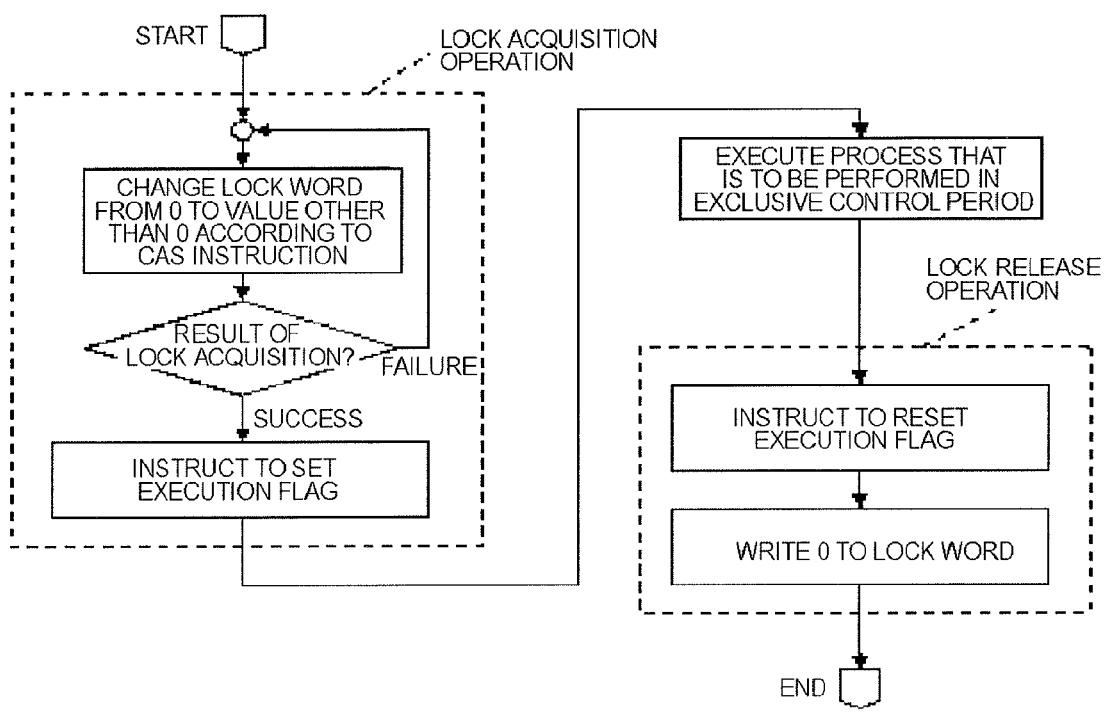
FIG. 8 is a flowchart illustrating a process in an exclusive control section which is a bottleneck.

FIG. 8 illustrates the flow of processes in the exclusive control section which is a bottleneck, implemented as a program in which the set instruction of the execution flag 250 and the reset instruction of the execution flag 250 are embedded, and which program operates on the processor unit 300. In a lock acquisition operation, the processor unit 300 changes the value of the lock word from 0 to a value other than 0 with a CAS instruction. When the operation has failed, the processor unit 300 repeatedly performs the CAS instruction step.

In contrast, when the operation of the CAS instruction has succeeded, the processor unit 300 executes the set instruction of the execution flag 250, and then executes a process that is to be executed in the exclusive control section. When the process is completed, the processor unit 300 executes the reset instruction of the execution flag 250, then releases a lock by writing the value 0 to the lock word, and terminates the process for exclusive control.

Here, the set instruction of the execution flag 250 and the reset instruction of the execution flag 250 are instructions that are embedded in advance in the step of creating an execution program.

As is clear from the operations of the initiation detecting unit 230 and the termination detecting unit 240, when the set instruction of the execution flag 250 is executed, the set signal is set to be valid, and the execution flag 250 is set. Moreover, when the reset instruction of the execution flag 250 is executed, the reset signal is set to be valid, and the execution flag 250 is reset.

Therefore, the execution flag 250 is set to be valid for a period after the set instruction of the execution flag 250 is executed and before the reset instruction of the execution flag 250 is executed, that is, for a period where a thread executes a process that is to be performed in the exclusive control section. The execution flag 250 is set to be invalid in the other periods. The operation of the cache memory 210 inputting the value of the execution flag 250 is the same as that described in the description of embodiments.

The present invention is not limited to the present embodiment, and various modifications may be made without departing from the spirit thereof. Moreover, although the structures and the like of the respective units and portions have been described in detail in the embodiments and implementation examples described above, the structures and the like may be changed in various ways without departing from the spirit and scope of the present invention.

The application claims priority to Japanese patent application No. 2010-138051, filed on Jun. 17, 2010, the entire disclosure of which is incorporated herein.

The invention claimed is:

1. A data processing device comprising an external memory that stores an instruction and data necessary for execution of the instruction and a plurality of processor units, each of the plurality of processor units comprising:
   cache memory that temporarily stores the instruction and the data;
   an instruction execution unit that reads the instruction and the data from the external memory via the cache memory and executes the instruction;
   an initiation detecting unit that detects an entering of a thread implemented by processing of the instruction execution unit into an exclusive control section, which is specified in advance to become a bottleneck;
   a termination detecting unit that detects an exiting of the thread out of the exclusive control section; and
   the exclusive control section in-execution flag that is set by an output of the initiation detecting unit and is reset by an output of the termination detecting unit,
   wherein the data processing device uses the value of the exclusive control section in-execution flag for controlling the cache memory.

2. The data processing device according to claim 1, wherein a replacement target of cache entries is determined using the value of the exclusive control section in-execution flag when the memory access of the instruction execution unit results in a cache miss.

* * * * *